United States Patent
Parthasarathy et al.

(10) Patent No.: US 7,941,569 B2
(45) Date of Patent: May 10, 2011

(54) INPUT/OUTPUT TRACING IN A PROTOCOL OFFLOAD SYSTEM

(75) Inventors: Mohan Parthasarathy, Karnataka (IN); Sriram Narasimhan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 11/884,874

(22) PCT Filed: Feb. 24, 2005

(86) PCT No.: PCT/IN2005/000065
§ 371 (c)(1),
(2), (4) Date: Aug. 22, 2007

(87) PCT Pub. No.: WO2006/090408
PCT Pub. Date: Aug. 31, 2006

(65) Prior Publication Data
US 2008/0168190 A1    Jul. 10, 2008

(51) Int. Cl.
*G06F 3/00* (2006.01)
*G06F 13/00* (2006.01)
(52) U.S. Cl. ............. 710/5; 710/8; 710/33; 710/52

(58) Field of Classification Search .............. None
See application file for complete search history.

(56) References Cited

U.S. PATENT DOCUMENTS

| | | | |
|---|---|---|---|
| 6,775,826 | B1 | 8/2004 | Zahavi et al. |
| 2001/0050903 | A1* | 12/2001 | Vanlint ............ 370/252 |
| 2005/0039078 | A1 | 2/2005 | Bradley et al. |
| 2005/0135415 | A1 | 6/2005 | Fan et al. |

OTHER PUBLICATIONS

Westrelin, Roland, Jan. 3, 2005, ieeexplore.org [online, accesssed on Jan. 29, 2011], URL: http://ieeexplore.ieee.org/stamp/stamp.jsp?tp=&arnumber=1375208.*

* cited by examiner

*Primary Examiner* — Tariq Hafiz
*Assistant Examiner* — Scott Sun (57) ABSTRACT

I/O tracing is implemented in a system in which an I/O device is configured for protocol offload. A data unit having headers and payload is replicated and the replicated unit sent to the end node along with the payload data. In an alternative embodiment, the I/O device keeps track of the one or more protocol headers layers separately from the application payload. Information defining the relationship between the headers and payload is sent to the end node to enable it to reconstruct the data unit.

18 Claims, 8 Drawing Sheets

INPUT/OUTPUT TRACING IN A PROTOCOL OFFLOAD SYSTEM

FIELD OF THE INVENTION

The present invention relates to the tracing of input/output (I/O) messages, particularly but not exclusively to implementing I/O tracing for systems having I/O devices that provide for protocol offload.

BACKGROUND OF THE INVENTION

Enterprise data centres and server farms for web hosting typically comprise densely populated rack mounted servers, networking and/or storage fabrics and storage devices that are centrally and often remotely administered. Lowering the cost of ownership by providing space savings and remote administration, and reducing data centre downtime, are some of the primary objectives for such data centres. Many of the problems seen with storage and network configurations in these environments can be narrowed down to issues related to one or more layers of protocols, including, but not limited to, corruption of protocol headers and/or data. The debugging and root cause analysis of certain classes of these problems, such as connectivity, performance and so on, usually require administrators or support personnel to see the input/output (I/O) messages exactly as they are transmitted or received on the external medium of the I/O device connected to an end node, for example a server. The ability to trace I/O helps administrators and support personnel in debugging protocol issues relating to storage, networking, or any remote communication mechanisms, for example, remote direct memory access (RDMA), that usually result in end node or application downtime for the customer's data centre.

In addition to administration and support requirements, customer demands on server performance are ever increasing. However, certain technologies used to increase server performance conflict with the I/O tracing techniques referred to above. One such performance increasing technique is known as protocol offload. I/O devices commonly provide partial or full offload of one or more protocols to conserve server resources and to improve overall server performance and application responsiveness. Essentially, protocol offload achieves this by removing from the server CPU the onerous protocol processing requirements involved with, for example, TCP/IP based applications. Instead, the processing is carried out by the I/O device, for example a network interface card/adapter, core I/O device implementation (LAN-on-motherboard) or a storage adapter. The TCP/IP protocol stack is therefore effectively transferred from the end node to the I/O device. In the case of full protocol offload, all of the packet protocol layer headers are stripped off at the I/O device and only the data needed by the user or kernel application is transferred to the end node.

The problem with this approach in the context of I/O tracing is that some or all of the protocol information is not then available to the end node, making I/O tracing extremely difficult.

SUMMARY OF THE INVENTION

The present invention aims to address the above problem.

In accordance with a first aspect of the invention, there is provided a method of input/output (I/O) tracing in a system in which an I/O device communicates with an end node, the I/O device being configured to perform protocol offload, the method comprising replicating a data unit at the I/O device, the data unit comprising one or more protocol headers and an application payload, the application payload comprising one or more units of application data, and making the replicated unit available to the end node for I/O tracing. The data unit may be an inbound packet received from an external medium connected to the I/O device or may be data received from the end node and intended for outgoing transmission on the external medium of the I/O device.

The replicated unit, for example a data packet, may be stored in local memory at the I/O device. By replicating the unit, the entire I/O including the protocol headers is available to the end node, so enabling I/O tracing, while the application payload can be directly used by the application running on the end node. The downside is that this approach may compromise the benefits of performing protocol offload at the I/O device, so that it may be best used in tracing only a small number of bytes in the I/O.

A completion message indicating completion of the replicated data transfer and payload transfer can be sent to the end node in the same or a different notification queue. If only a small number of bytes are required to be traced, for example less than 48, the replicated data can be sent to the end node as part of the completion message.

In accordance with a second aspect of the invention, there is provided a method of input/output (I/O) tracing in a system in which an I/O device communicates with an end node, the I/O device being configured to perform protocol offload, the method comprising receiving a data unit having one or more protocol headers and an application payload, the application payload comprising one or more units of application data and transferring the protocol headers to the end node separately from the application payload together with association information for associating the protocol headers with the application payload. The association information may be used by the end node software to associate the one or more headers and payload, so enabling I/O tracing.

In a further aspect, there is provided a method of input/output (I/O) tracing in a system in which an I/O device communicates with an end node, the I/O device being configured to perform protocol offload, the method comprising receiving an application payload from the end node for transmission on an external medium of the I/O device, associating the application payload with one or more protocol headers and transferring the protocol headers to the end node together with association information for associating the protocol headers with the application payload.

The transfer of data from the I/O device to the end node may be performed in any suitable way. The transfer can be by the end node performing a programmed I/O read or by a direct memory access operation (DMA). The I/O device may DMA the trace and payload information to the end node memory on the same I/O channel or on different channels, for example by replicating the I/O trace information on a different port in a multi-port I/O device.

The association information can be sent in a completion message in the same notification queue as the payload completion message or separately from the payload completion message in a device that supports multiple notification queues.

According to the invention there is also provided an I/O device for use in a system for I/O tracing, in which the device communicates with an end node, the I/O device being configured to perform protocol offload, the device comprising means for replicating a data unit having one or more protocol headers and one or more units of application payload and means for making the replicated unit available to the end node for I/O tracing.

According to the invention, there is further provided an I/O device for use in a system for I/O tracing, in which the device communicates with an end node, the device comprising means for receiving a data unit having one or more protocol headers and one or more units of application payload, protocol offload means for separating the one or more protocol headers from the application payload, means for generating association information to enable the end node to associate the one or more protocol headers with the application payload and means for transferring the one or more protocol headers, the application payload and the association information to the end node.

According to the invention, there is still further provided an I/O device for use in a system for I/O tracing, in which the device communicates with an end node, the device comprising means for receiving data from the end node, protocol offload means for associating the data with one or more protocol headers and means for generating association information to enable the end node to associate the one or more protocol headers with the data and means for transferring the one or more protocol headers and the association information to the end node.

DETAILED DESCRIPTION

Figure 1:
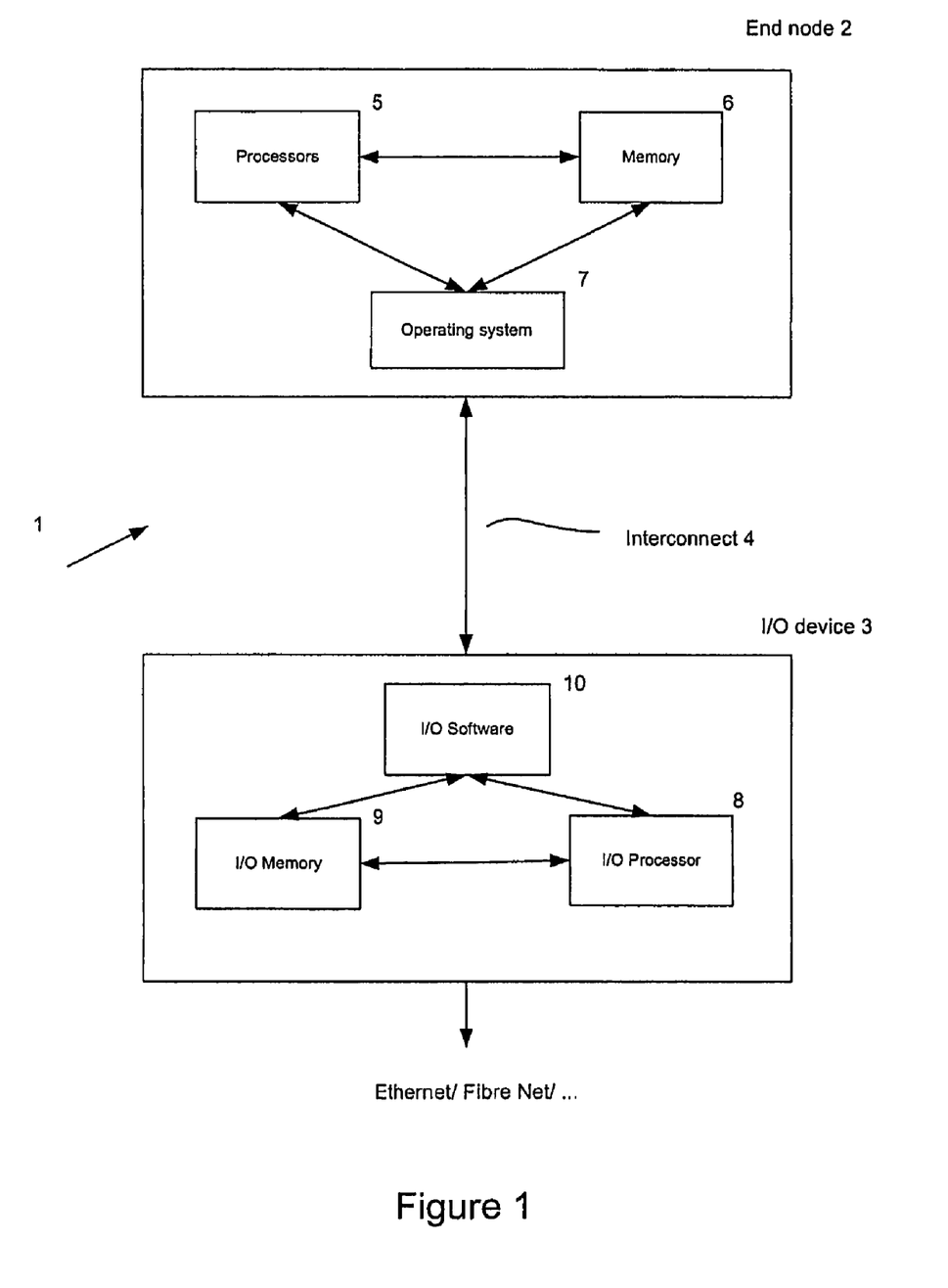
FIG. 1 is an outline structure of a portion of a data centre network illustrating a server and a corresponding I/O device.

FIG. 1 illustrates a portion of an end node configuration in a data centre 1 in which an end node 2 is connected to an input/output (I/O) device 3 via an interconnect 4. An example configuration of the end node 2 comprises one or more processors 5 and memory 6 operating under the control of software 7. The end node 2 is, for example, a server, such as a compute server, blade server, symmetric multiprocessor or a CC-NUMA (Cache Coherent Non-Uniform Memory Access) machine. A compute server refers to a machine that has one or more processors and memory interconnected according to a particular architecture without any directly attached I/O. I/O devices 3 are accessed through an interconnect 4 or through a front-end processor that is responsible for handling all I/O devices. A blade is a thin, modular electronic circuit board containing one or more processors, memory and possibly I/O devices, that is intended to serve a dedicated set of one or more applications. A blade server is a high density server designed to generate less power and heat and thus save energy cost and space, that consists of one or more blades usually connected to each other and to common I/O devices 3 through a common high speed interconnect 4. A symmetric multiprocessor refers to an implementation where two or more processors have equal access to I/O devices and memory and are controlled by a single operating system. Applications can be run on any of the processors, interchangeably, at the operating system's discretion. A CC-NUMA machine is one where two or more processors are connected to physically distributed memory through a crossbar, with no guarantee that a memory access issued from multiple processors will complete in the same time. The processors and memory controller participate in a cache coherent protocol, for example, the 'snoop' protocol.

The end node is not limited to the above described configurations, which are provided for the purpose of illustrating the many different possibilities.

The I/O device 3 is responsible for transferring data between the internal interconnect 4, which may be, for example, PCI, PCI-X, PCI-Express, Hypertransport, Rapid I/O and so on, and an external network such as Ethernet, Infiniband, Fiber Channel and so on. An example configuration of the I/O device 3 comprises an I/O processor 8 and local memory 9 operating under the control of I/O software 10, which may, for example, be implemented by a microcode engine or finite state implementation. I/O devices that are configured to perform protocol offload are increasingly common and include TCP Offload Engines (TOE) as well as Remote Direct Memory Access (RDMA) devices such as Infiniband HCA or iWARP (RDMA over IP) network interface cards (NICs).

Although a processor based I/O device is shown in the example of FIG. 1, the invention is not limited to this type of I/O device, but could be used with other types of I/O device, including, for example, hardware based I/O devices with internal or external I/O memory.

Figure 2:
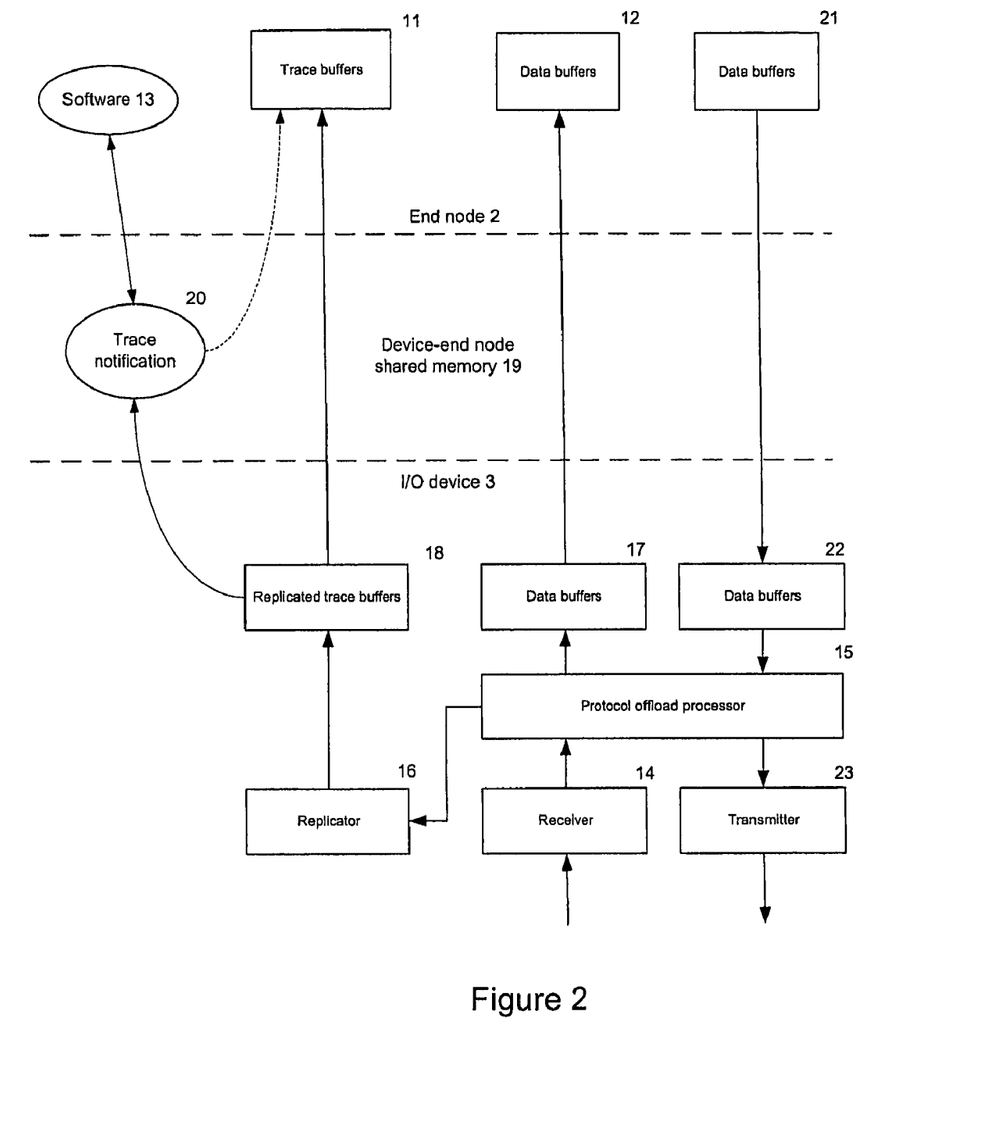
FIG. 2 is a diagram illustrating a first embodiment of the invention in which trace information is created by replicating incoming or outgoing I/O data.

FIG. 2 illustrates a system according to a first embodiment of the invention in which the entire I/O is replicated in an I/O device local memory for retrieval by the end node 2. The system of FIG. 2 implements I/O processing for both inbound and outbound I/O, which will be described separately for convenience. Referring first to the processing of inbound I/O, the end node 2 includes end node trace buffers 11 and end node data buffers 12 and runs end node software 13. The software may, for example, comprise operating system software or embedded software/firmware. An I/O device 3 includes an I/O data unit receiver 14, a protocol offload processor 15, a data unit replicator 16 and I/O data buffers 17 and replicated trace buffers 18. The operating system software 13 may communicate with the I/O device 3 via device-end node shared memory 19, as will be explained in more detail below. The device-end node shared memory 19 may be host memory that is mapped for direct memory access (DMA) transfers, host memory that is associated with the I/O device (memory mapped I/O) and so on. A trace notification process 20 is used to communicate completion of data and trace information transfer to the end node software 13, as will be described in more detail below. The overall operation of the system of FIG. 2 is explained with reference to FIG. 3.

Figure 3:
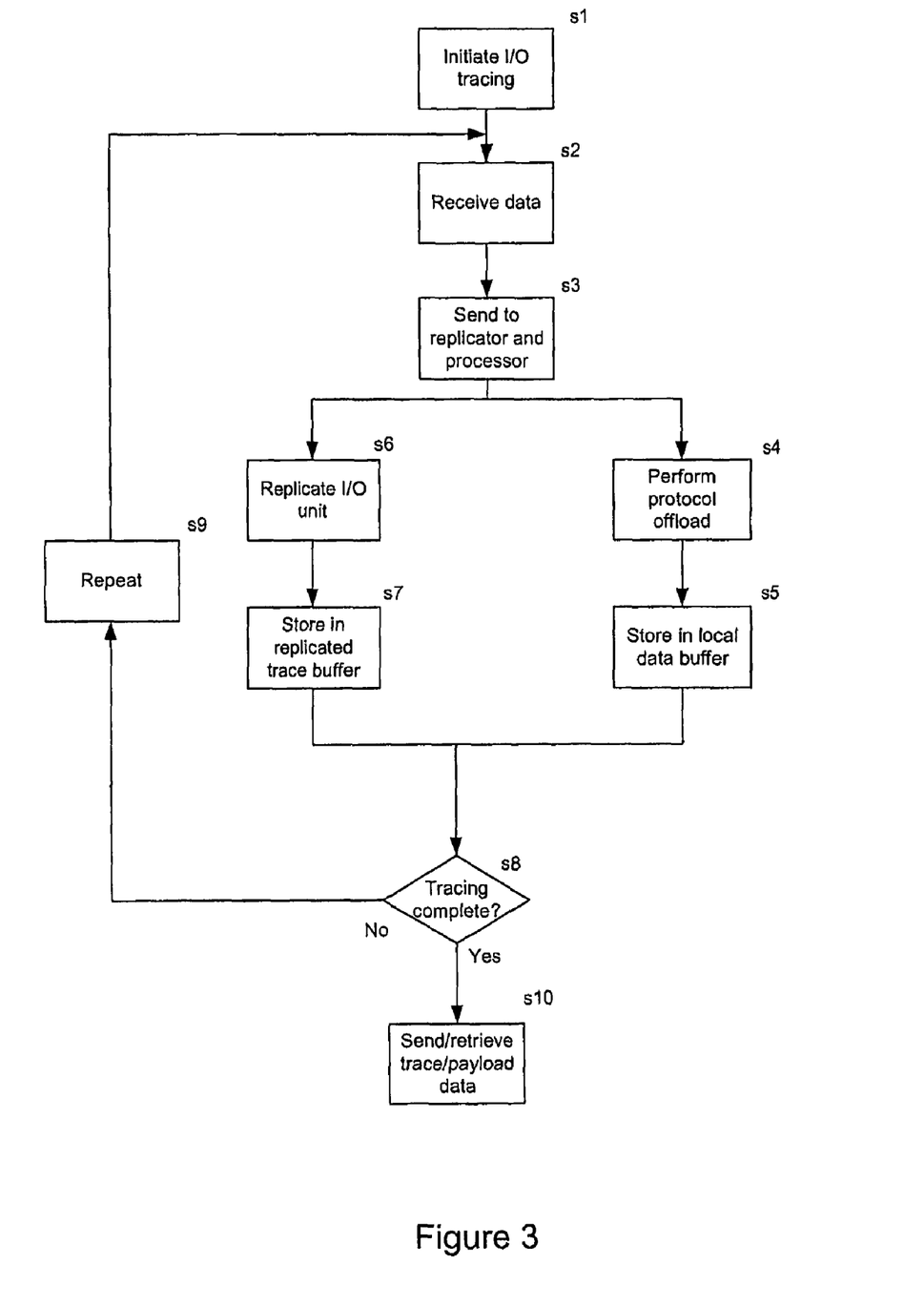
FIG. 3 is a flow chart illustrating operation of the system of FIG. 2 in relation to incoming data.

Referring to FIG. 3, the end node software 13 initiates I/O tracing by communicating the amount of data that is to be replicated to the I/O device 3 (step s1). The I/O device 3 receives an I/O data unit (step s2). The I/O data unit may be a data packet and may comprise multiple headers per unit of I/O, for example, a unit of I/O for a TCP offload I/O device may have multiple TCP/IP/Ethernet headers with data interspersed between them. Similarly, there may be multiple layers of protocols offloaded in an I/O device. For example, an iSCSI offload device has iSCSI headers in addition to TCP/IP headers.

The receiver 14 sends the data unit to the offload processor 15 and to the replicator module 16 (step s3). At the offload processor 15, the protocol is processed, resulting in stripping of the protocol layer headers from the application payload (step s4). This step can be achieved using the conventional protocol offload technology described above. The resulting application payload is stored in the local data buffers 17 (step s5). At the replicator module 16, the data unit is copied in its entirety (step s6) and stored in the replicated trace buffers 18 (step s7). The copied data units are referred to as the trace information for the purpose of this embodiment. The above described process (steps s2 to s7) is repeated for the amount of data specified by the end node software 13 (steps s8, s9).

The locally stored trace information is then available for retrieval by the end node software 13. The information can be retrieved in any suitable manner supported by the I/O device, for example, periodically, at intervals specified by the software 13, or on completion of the I/O operation (step s1). The retrieval mechanism can include programmed I/O reads from the I/O device buffers 17, 18 or the use of a direct memory access (DMA) transfer to transfer the data to the end node buffers, using a work notification mechanism. Requests are posted to one or more work queues (WQ) in the device-end node shared memory 19 in a form known as descriptors, which may contain control, data and buffer address segments. One or more notification or completion queues (NQ/CQ) is/are associated with the one or more work queues to indicate the completion status of the requests. Where a single notification queue is associated with multiple work queues, it can contain the completion statuses for each of the work queues, so obviating the need for the end node software to poll multiple work queues for completion status information. Notification queues are also used by the I/O device for posting notifications of inbound data received at the I/O device from the external interface.

For example, I/O driver software 13 in the end node issues a work request to the I/O device by writing the request to a work queue (WQ) in the device-end node shared memory 19. It also allocates the end node buffers in end node memory. The I/O device performs the DMA transfer to the end node buffers and notifies the operating system of completion of the task via completion queue entries indicating payload transfer completion and trace buffer completion, indicated as the trace notification process 20 in FIG. 2. Depending on the particular implementation, these entries can be posted as different completion entries or can be put together into a single entry, to the same or different notification queues.

The completion queue entry also includes a pointer to the trace buffer in the end node memory, so that the end node software can perform I/O tracing.

In one variant of this embodiment, the I/O device 3 does a DMA transfer of the replicated trace information into the end node trace buffers 11 along with the application payload stream into the end node data buffers 12 on the same I/O channel. The I/O device marks the replicated trace information differently from the application payload data, for example by setting a trace bit in the work completion/notification to indicate this. The end node software can then dump the trace information from the trace buffers 11.

In a further variant of this embodiment, the I/O device 3 does a DMA transfer of the replicated trace information on to the end node memory along with the application payload stream on different I/O channels. An example of this includes replicating the I/O trace information on a different port in a multi-port I/O device, for example using a different PCI function or interrupt vector for PCI/PCI-X/PCI-Express interconnects. A further example is replicating the I/O trace information onto a different notification queue in an I/O device that has multiple notification queues for communicating with the end node, which may or may not be associated with different PCI functions or interrupt vectors for PCI/PCI-X/PCI-Express interconnects.

In a yet further embodiment, in the event that only a small number of bytes require tracing, the replicated data can be sent as part of the trace buffer completion, rather than being separately DMA'd to the end node buffers. The trace completion information includes a bit to indicate that it has inline information, rather than a pointer to the trace buffer.

As the trace information includes entire I/O data units, tracing software installed at the end node 2 may be used to debug protocol problems. Protocol tracing/debugging software is well-known and will not be described in detail here.

As mentioned above, FIG. 3 illustrates the principles of implementing I/O tracing for inbound I/O. The same principles also apply for tracing outbound I/O, as illustrated in FIG. 4.

Figure 4:
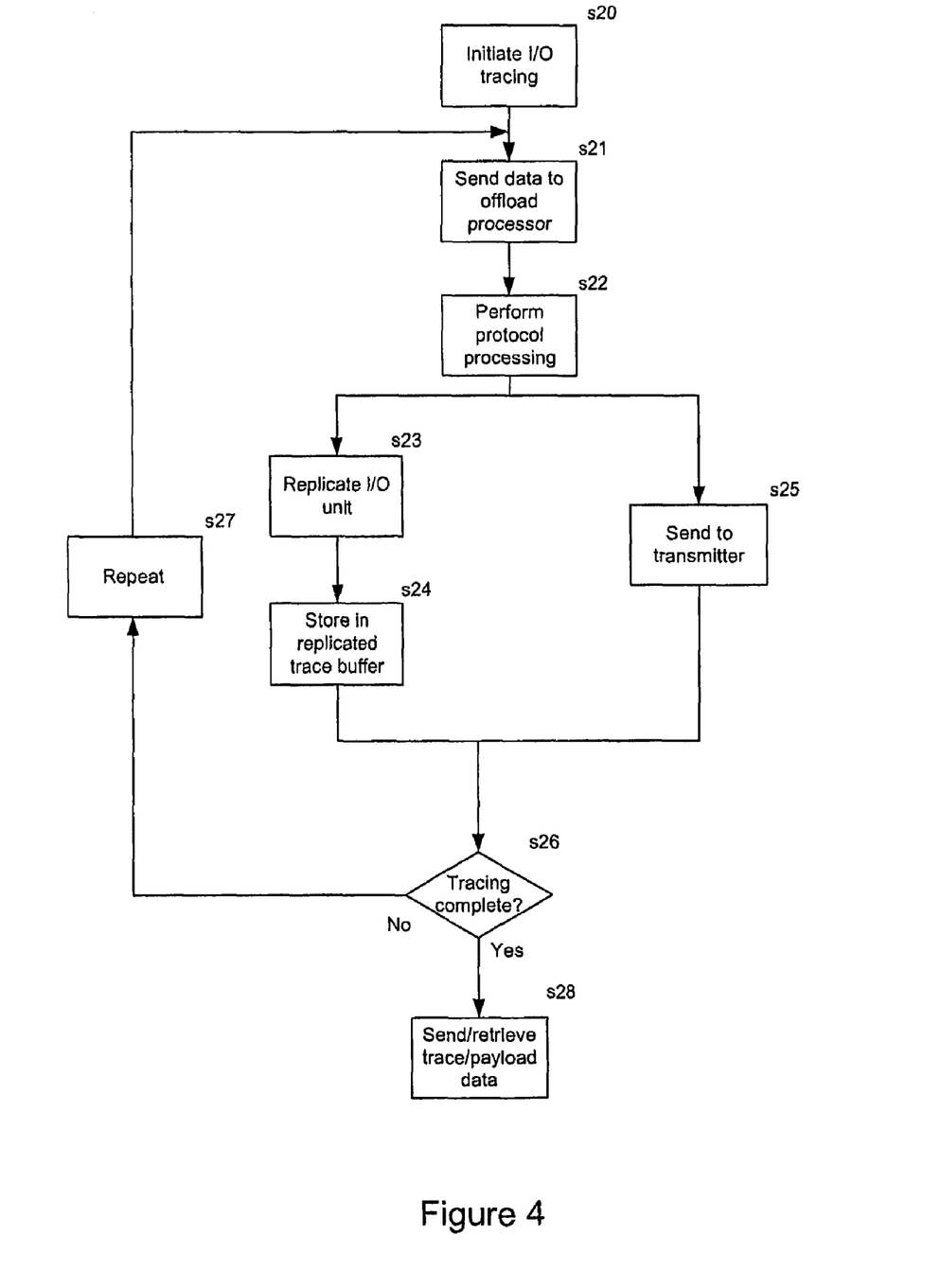
FIG. 4 is a flow chart illustrating operation of the system of FIG. 2 in relation to outgoing data.

Referring to FIGS. 2 and 4, following initiation of outbound I/O tracing (step s20), data is sent from data buffers 21 at the end node 2 to the offload processor 15, via data buffers 22 at the I/O device 3 (step s21). At the offload processor 15, protocol headers are added in accordance with the transmission protocol to be used (step s22). The completed data units comprising protocol headers and application payload are sent to the replicator 16 for replication (step s23) and subsequent storage in the replicated trace buffer (step s24). The completed data units are also sent to a transmitter 23 (step s25) for transmission on the external medium of the I/O device. The above described process (steps s21 to s25) is repeated for the amount of data specified by the end node software 13 (steps s26, s27). As is also described above, the trace information, comprising the replicated data units, can then be sent to or otherwise retrieved by the end node 2 (step s28).

Figure 5:
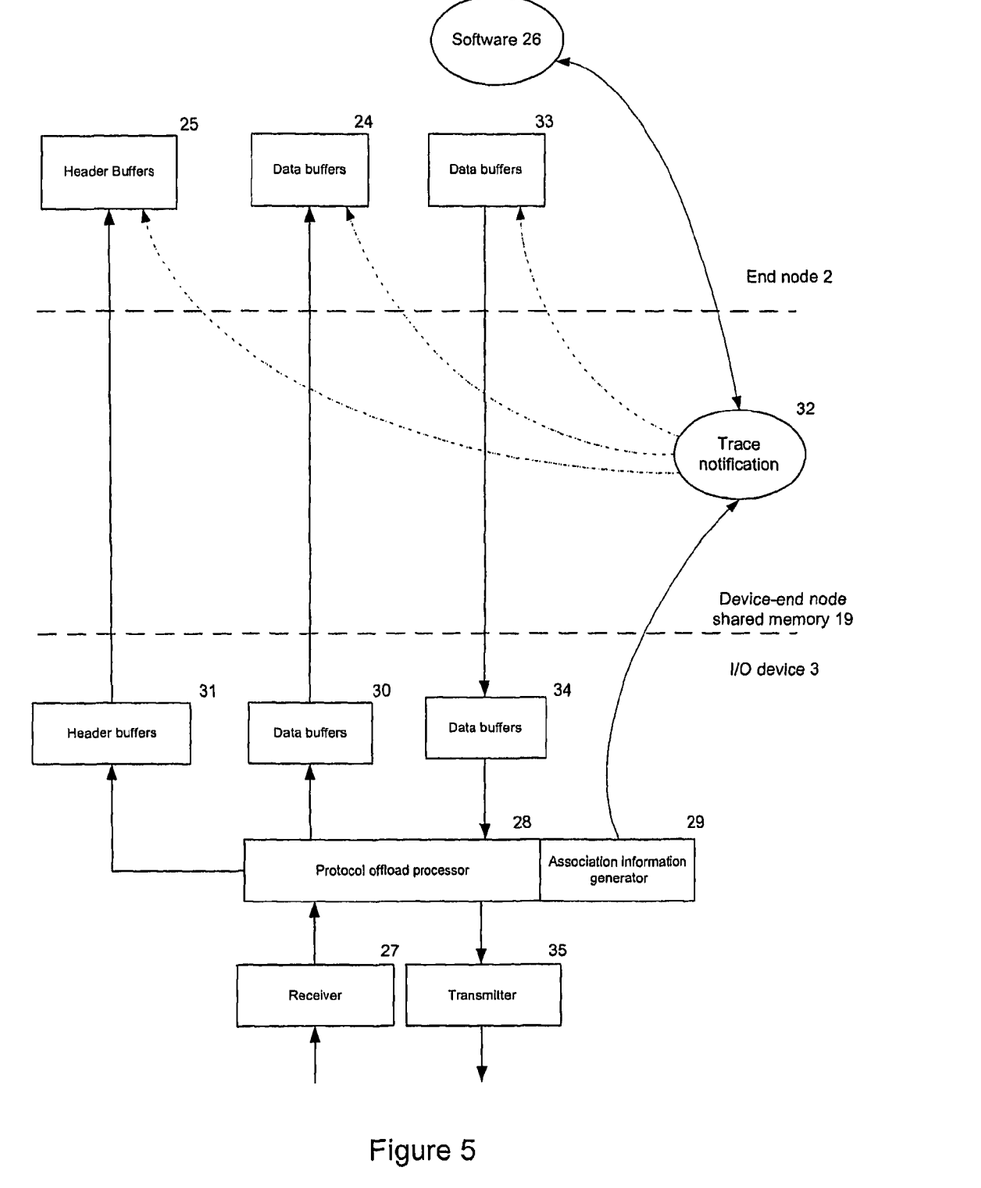
FIG. 5 is a schematic diagram illustrating a system according to a second embodiment of the invention in which trace information is provided by maintaining association information defining an association between protocol headers and payload data in an incoming or outgoing data unit.

FIG. 5 illustrates a system according to a second embodiment of the invention in which the I/O device 3 keeps track of the one or more layers of protocol headers in an I/O data unit separately from the application payload, and maintains an association between each header and its respective application payload. As in relation to the first embodiment, the principles of processing inbound I/O will be described first, although these principles also apply to the processing of outbound I/O. The end node 2 includes end node data buffers 24 and end node trace buffers 25, together with controlling software 26. The I/O device 3 includes an I/O data unit receiver 27, a protocol processor 28, an association information generator 29 as well as I/O data buffers 30 and protocol header buffers 31. A trace notification process 32 is shown in the end node-device region. The operation of the system of FIG. 5 is explained with reference to FIG. 6.

Figure 6:
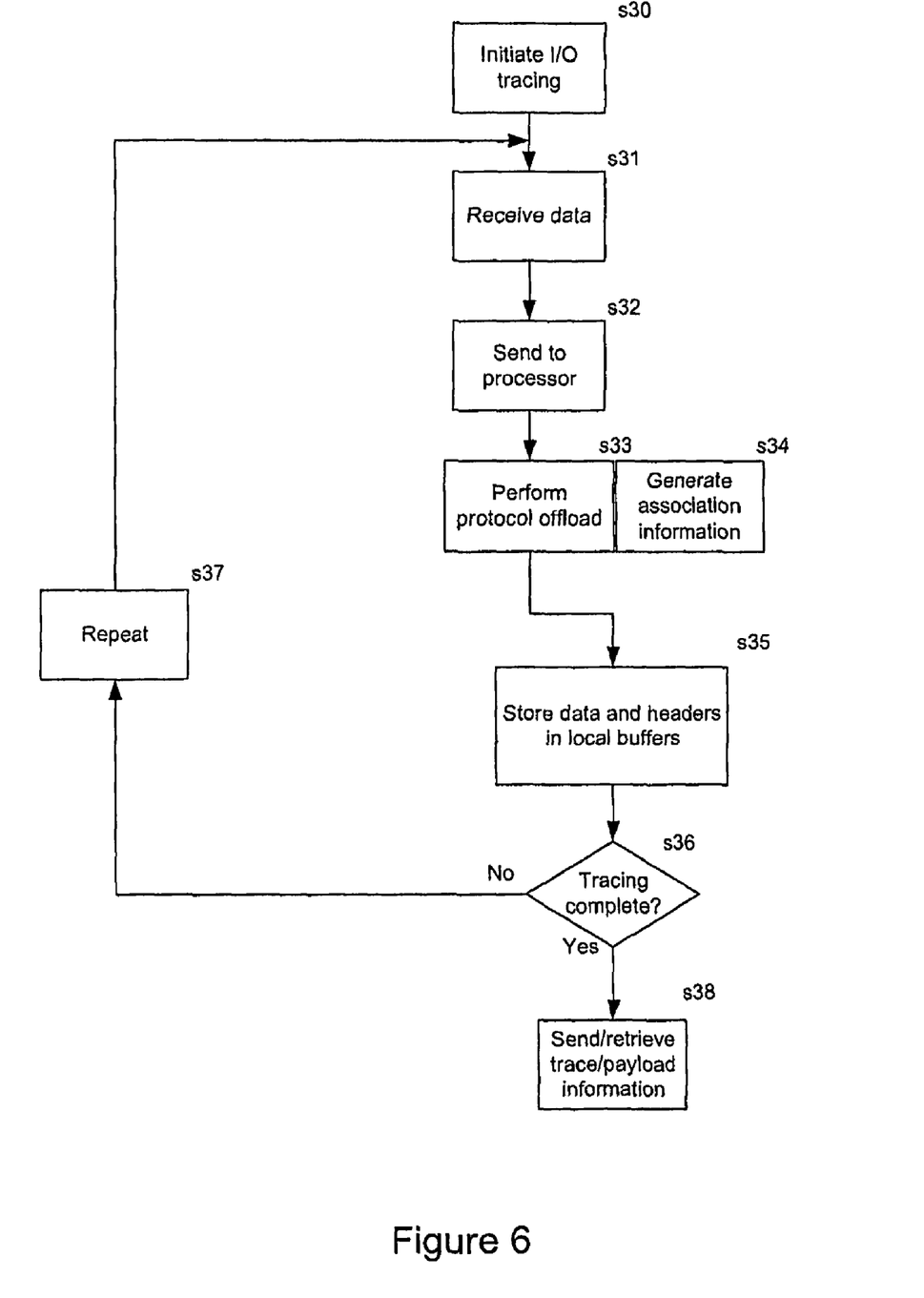
FIG. 6 is a flow chart illustrating operation of the system of FIG. 5 in relation to incoming data.

Referring to FIG. 6, when tracing is enabled, the end node software 26 programs the I/O device 3 to transfer to the end node 2 a specified number of bytes of the I/O, including the protocol headers and application payload (step s30). For each I/O data unit received by the I/O device (step s31), the receiver 27 sends the data unit to the offload processor 28 (step s32). At the offload processor 28, the protocol layers are processed, resulting in stripping of the protocol layer headers from the application payload (step s33). During this processing step, the association information generator module 29 produces association information comprising the offset of the header or payload in the data stream, a timestamp, an I/O identifier used to identify all the association information relating to a single unit of I/O and a data/header length, together with a pointer to the trace/data buffer, for example in the form of a buffer descriptor (step s34). The resulting protocol headers and application payload are stored in respective buffers (step s35). The above described process (steps s31 to s35) is repeated for the amount of data specified by the end node software 26 (steps s36, s37).

Once the requisite amount of data has been processed, the I/O device 3 then transfers the protocol headers and application payload into memory locations specified by the software together with the association information, using, for example, a DMA transfer (step s38). The software can then associate the headers and payload to trace the complete I/O messages, as explained in more detail below.

The association information can be posted to the end node 2 in any suitable way. For example, the association information is communicated via the completion queue (CQ) in the buffer descriptor, as indicated by the trace notification process 32 in FIG. 5, which schematically illustrates the pointers to data and header buffers. Each unit of association information points to an associated payload/header buffer.

Figure 7:
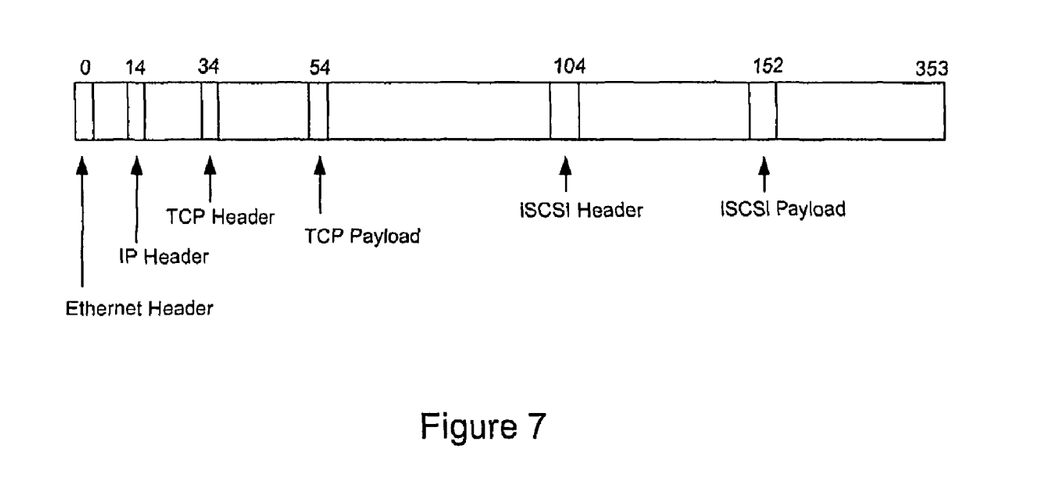
FIG. 7 is an example of a buffer structure for storing headers and payload information.

The method of providing association information and therefore enabling the reconstruction of the I/O data unit from separate header and payload information is now explained using the example of an iSCSI offload adapter that also does TCP/IP protocol offload, so that there are 2 different protocols at multiple layers within the protocol offload adapter. The incoming data stream is as follows:

<Ethernet+TCP/IP header–54 bytes><TCP data stream–300 bytes> where the <TCP data stream> contains in order:
<TCP payload–50 bytes
<iSCSI header–48 bytes>
<iSCSI payload–202 bytes>

The I/O device places 2 headers, the TCP/IP/Ethernet header and iSCSI header separately from the TCP payload and iSCSI payload. Then the following association information is produced, in the format [offset, timestamp, identifier, length]:
 a) [0, t1, 1, 54], which points to an Ethernet/TCP/IP header buffer
 b) [54, t2, 1, 50], which points to a TCP payload buffer
 c) [104, t3, 1, 48], which points to an iSCSI header buffer
 d) [152, t4, 1, 202] points to an iSCSI payload buffer
The generated buffers are illustrated in FIG. 7.

The end node software can then reconstruct the entire I/O data unit by grouping all the association information with the same identifier, and using the offsets, data length and buffer descriptors to identify each corresponding part of the data unit. The TCP and iSCSI headers can be processed by different software layers, and the timestamps used to reconstruct the sequence of packets even if the different software layers process packets in different orders.

In another example, an application does an iSCSI read of 2048 bytes. In this case, the incoming data stream will look as follows:
<Ethernet+TCP/IP header1–54 bytes>
<iSCSI header–48 bytes>
<iSCSI payload1–1398 bytes>
<Ethernet+TCP/IP header2–54 bytes>
<iSCSI payload2–650 bytes>

The adapter places the 3 headers separately. The iSCSI payload, comprising payload1 and payload2 can be placed into a single payload buffer. The following information will be posted to the completion queue (CQ) as part of the descriptor:

[0, t1, 1, 54] points to TCP/IP/Ethernet header1
 [54, t2, 1, 48] points to ISCSI header1
 [102, t3, 1, 1398] points to ISCSI payload buffer
 [1500, t4, 1, 54] points to TCP/IP/Ethernet header2
 [1554, t5, 1, 650] points to ISCSI payload buffer
so that the end node software can reconstruct the I/O data unit. In principle, the TCP/IP/Ethernet headers can also be placed into a single buffer. The association information may be communicated to the end node 2 in any number of different ways supported by the I/O device. For example, the I/O device may allocate a predefined portion of its memory for I/O trace information, which comprises the headers together with the association information. When a specified threshold of completed I/O is reached, the end node software 26 retrieves the trace information on the same I/O channel using any number of available techniques, for example by I/O reads or DMA transfers, as in the case of the first embodiment described above. The trace information may alternatively be sent through another I/O channel. As already discussed above in relation to the first embodiment, examples of this include, but are not limited to replicating the trace information on a different port in a multi-port I/O device and communicating the association information through a notification queue that is different to that to which the payload completion is sent in an I/O device that supports multiple notification queues for communicating with the end node.

The implementation of I/O tracing for outbound I/O will now be described with reference to FIGS. 5 and 8.

Figure 8:
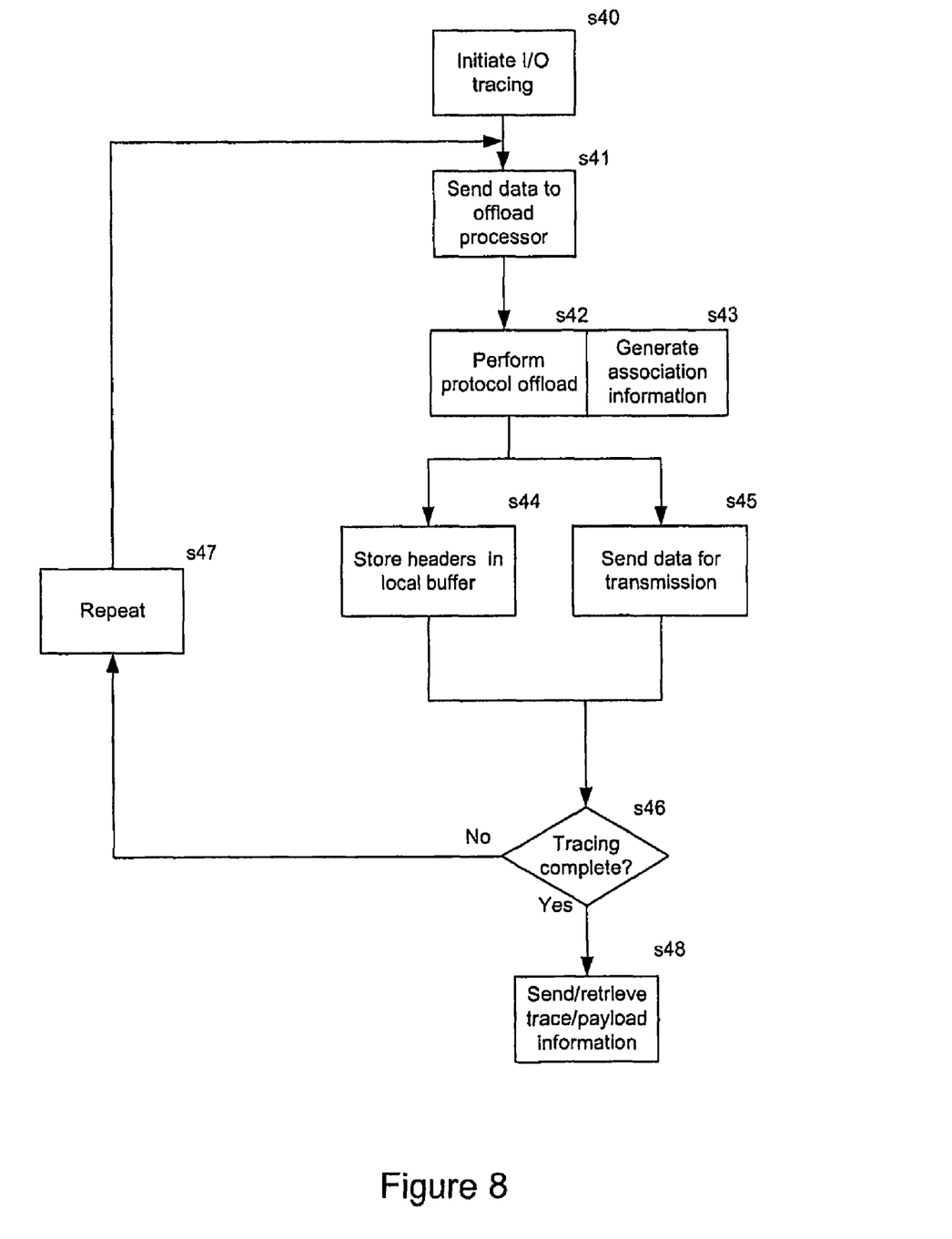
FIG. 8 is a flow chart illustrating operation of the system of FIG. 5 in relation to outgoing data.

Referring to FIGS. 5 and 8, following initiation of outbound I/O tracing (step s40), data is sent from data buffers 33 at the end node 2 to the offload processor 28, via data buffers 34 at the I/O device 3 (step s41). At the offload processor 28, protocol headers are added in accordance with the transmission protocol to be used (step s42). Association information describing the relationship between the headers and the data is generated as described above (step s43). The headers are stored in a local buffer 31, while the data is sent to a transmitter 35 for transmission on the external medium of the I/O device, for example, Ethernet/Fibre Net and so on. The above described process (steps s41 to s45) is repeated for the amount of data specified by the end node software 13 (steps s46, s47). As is also described above, the trace information, comprising the headers and the association information, can then be sent to or otherwise retrieved by the end node 2 (step s48).

The second embodiment described above may be more suited to the tracing of larger numbers of bytes at higher speeds, as compared with the first embodiment. In determining a suitable method for I/O tracing of protocol offload I/O devices, the end node software may consider a number of factors that impact on performance. These factors may include the processor-memory interconnect and I/O interconnect bandwidth utilisation, in relation to transmission of information by replication of the entire packet or separate transfer of headers and application payload, application responsiveness, in relation to waiting for a specified threshold of completed I/O before retrieving the trace information, and the I/O device set up latency, in relation to determining whether to use one or more DMA transfers for headers for every I/O data unit, or one DMA transfer for a given threshold of I/O. The optimal approach may be achieved by a combination of the methods disclosed in the above embodiments, based on the number of bytes to be traced.

It will be understood by a person skilled in the art that the above disclosed methods are applicable irrespective of the layer of end node software that performs the I/O tracing. For example, this layer may be a kernel I/O device driver in a kernel operating system (OS) or a user space I/O component in an O/S bypass environment.

It will further be understood that the specific techniques for transferring trace information from the I/O device to the end node are not limited to those techniques disclosed above, but may be any technique or combination of techniques that is supported by the I/O device and system configuration.

The invention claimed is:

1. A method of input/output (I/O) tracing in a system in which an I/O device communicates with an end node, the I/O device being configured to perform protocol offload, the method comprising:
   replicating a data unit at the I/O device, the data unit comprising, protocol offload data, one or more protocol headers and an application payload, the application payload comprising one or more units of application data; and
   making the replicated unit available to the end node for I/O tracing.

2. A method according to claim 1, wherein the data unit is received from an external medium connected to the I/O device.

3. A method according to claim 1, wherein the application payload is sent from the end node to the I/O device for transmission on an external medium connected to the I/O device.

4. A method according to any one of the preceding claims, comprising storing the replicated unit in local memory at the I/O device.

5. A method according to claim 4, further comprising retrieving the replicated unit from the local memory.

6. A method according to claim 5, comprising retrieving the replicated unit on request by the end node.

7. A method according to claim 5, comprising retrieving the replicated unit periodically.

8. A method according claim 1, comprising performing a Direct Memory Access DMA transfer of the replicated unit to the end node.

9. A method according to claim 1 or 2, comprising transferring the replicated unit and application payload over the same I/O channel.

10. A method according to claim 1 or 2, comprising transferring the replicated unit and application payload over different I/O channels.

11. A method according to claim 10, comprising replicating the data unit onto a different port in a multi-port I/O device.

12. A method according to claim 10, comprising, for a PCI based interconnect, sending the application payload and replicated data units using different PCI functions or interrupt vectors.

13. A method according to claim 10, comprising using different notification queues for sending completion messages for each of the application payload and replicated data units in an I/O device that has multiple notification queues for communicating with the end node.

14. A method according to claim 1, comprising sending a completion message to the end node to indicate completion of transfer of the replicated unit.

15. A method according to claim 14, comprising sending the replicated unit to the end node in the completion message.

16. A method according to claim 1, comprising performing I/O tracing at the end node using information from the replicated unit.

17. A computer program which, when executed by a processor, is configured to perform the method of claim 1.

18. An I/O device for use in a system for I/O tracing, in which the device communicates with an end node, the I/O device being configured to perform protocol offload, the device comprising:
   means for replicating a data unit having protocol offload data, one or more protocol headers and one or more units of application payload; and
   means for making the replicated unit available to the end node for I/O tracing.

* * * * *

UNITED STATES PATENT AND TRADEMARK OFFICE
CERTIFICATE OF CORRECTION

| | | |
|---|---|---|
| PATENT NO. | : 7,941,569 B2 | Page 1 of 1 |
| APPLICATION NO. | : 11/884874 | |
| DATED | : May 10, 2011 | |
| INVENTOR(S) | : Mohan Parthasarathy et al. | |

It is certified that error appears in the above-identified patent and that said Letters Patent is hereby corrected as shown below:

In column 9, line 37, in Claim 8, after "according" insert -- to --.

Signed and Sealed this
Twentieth Day of December, 2011

David J. Kappos
*Director of the United States Patent and Trademark Office*